3,008,891
NUCLEAR REACTORS

Herbert Chilvers Knights and William Rodwell, Culcheth, near Warrington, England, assignors to United Kingdom Atomic Energy Authority, London, England
Filed Feb. 6, 1959, Ser. No. 791,709
Claims priority, application Great Britain Feb. 19, 1958
3 Claims. (Cl. 204—193.2)

This invention relates to nuclear reactors and it provides support and location for a horizontally orientated cylindrical pressure vessel and its contained reactor core.

A nuclear reactor design incorporating a horizontally orientated cylindrical pressure vessel has merit in that the cylindrical shape of the vessel allows for a compact arrangement of the reactor core within the vessel, and the horizontal orientation allows for a reduction in the overall height of the reactor as compared with a vertical orientation. In such a design, however, consideration must be given not only to the provision of stable support for the vessel and core without undue stressing of the vessel, but also to the location of the vessel and core during reactor operation when temperature gradients exist between the vessel and the core.

According to the present invention a nuclear reactor of the kind comprising a reactor core supported inside a horizontally orientated cylindrical pressure vessel combined with a support structure is characterised in that the weight supports for the pressure vessel in the support structure and the weight supports for the core in the pressure vessel are radially acting relative to the pressure vessel and in line so as to avoid bending stresses in the pressure vessel due to the weight of the core, and in that the core is located in the pressure vessel and the pressure vessel is located in the support structure along the uppermost surfaces of the core and the pressure vessel by longitudinal keys and keyways.

Figure 1:
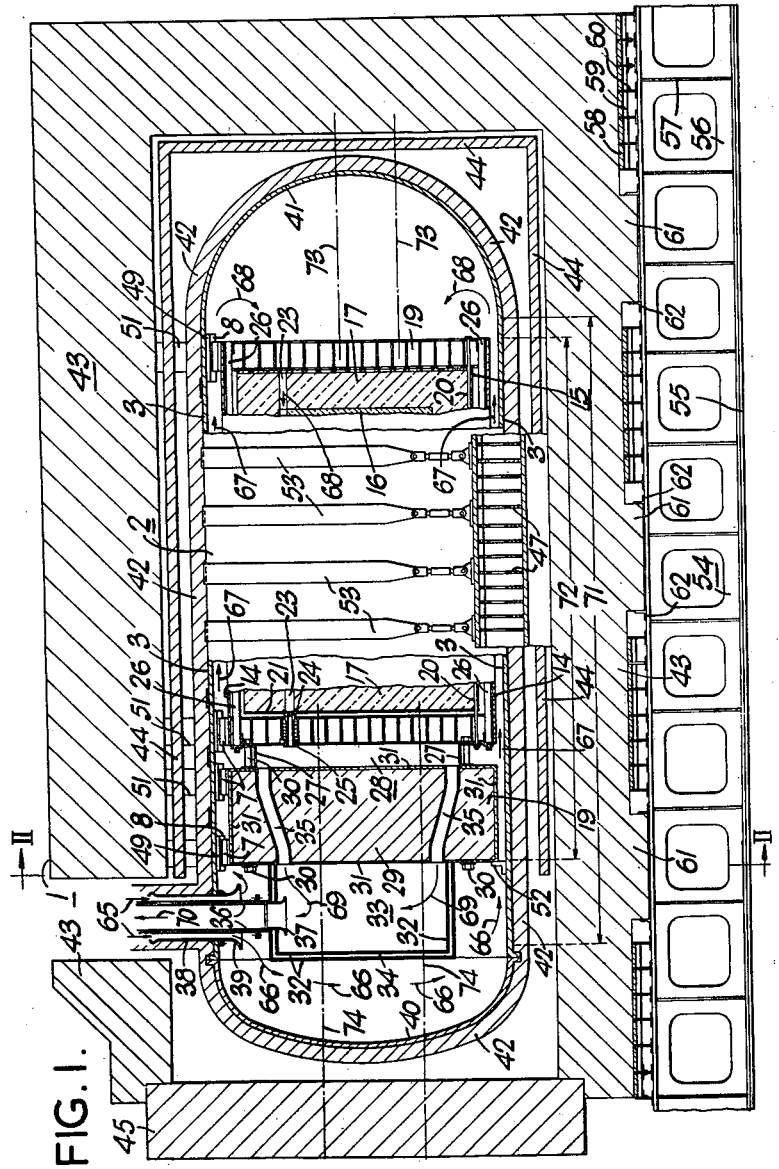
Figure 2:
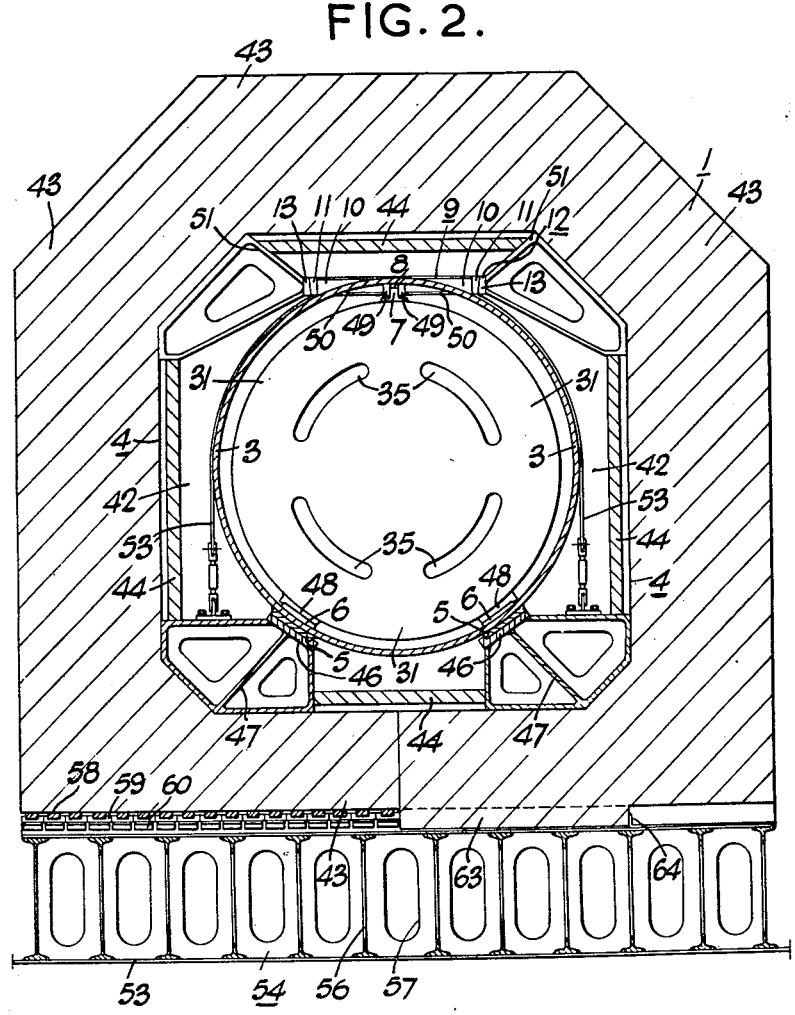

By way of example, an embodiment of the invention will now be described with reference to the accompanying drawings in which:

FIG. 1 is a side view, partly in medial section of a nuclear reactor according to the invention, and FIG. 2 is an end view in section on a line corresponding to line II—II of FIGURE 1.

Referring to the drawings, in the construction shown therein, a nuclear reactor 1 comprises a reactor core 2 supported inside a horizontally orientated cylindrical pressure vessel 3 combined with a support structure 4. The pressure vessel 3 is supported in the support structure 4 by two series of weight support pads 5 and the core 2 is supported in the pressure vessel 3 by two series of weight support pads 6, the pads 5, 6 being radially acting relative to the pressure vessel 3 and in line so as to avoid bending stresses in the pressure vessel 3 due to the weight of the core 2. The core 2 is located in the pressure vessel 3 along the uppermost surface of the core 2 by longitudinal keys 7 and keyways 8. The pressure vessel 3 is located in the support structure 4 along the uppermost surface of the pressure vessel 3 by longitudinal keys 9, formed by girders 10 carrying tapered end pads 11, and keyways 12 in the form of tapered pads 13 carried by the support structure 4.

In greater detail, the core 2 comprises a cylindrical core skirt 14 containing a graphite moderator structure 15 of cylindrical form having a central core part 16 and a surrounding reflector part 17. The moderator structure 15 extends between end support grids 18, 19 which are located spanning the ends of the skirt 14 and are connected by tie bolts 20. The moderator structure 15 has perforated end plates 21, 22 and longitudinal fuel element channels 23 and is compressed axially by spring loaded members 24 slidable in bearing bushes 25 fitted to the end support grid 18. The members 24 are tubular thus providing a continuance of the fuel element channels 23 through the end support grid 18. (Only one of each part denoted by the numerals 20, 23, 24, 25 is shown for clarity.)

Torque tubes 26 are shown which form part of suitable restraint device for the moderator structure 15.

A flanged ring 27 forms a gas space 28 between the end support grid 18 and a cylindrical intermediate shield 29. The ring 27 and the shield 29 are connected to the end support grid 18 by tie bolts 30, the shield 29 having a casing 31. A double-walled container 32 forms a gas space 33 and a heat insulating space 34. The spaces 28, 33 are connected by four equi-spaced ducts 35 passing through the shield 29. A multi-wall gas duct 36 connects with a flared ring 37 passing through and secured to the container 32 and a gas duct 38 passing through and secured to the pressure vessel 3 connects with a flared ring 39. The pressure vessel 3 has a detachable end cap 40 and an integral domed end 41 and is surrounded by a layer of thermal insulating material 42. The pressure vessel 3 is enclosed by a concrete biological shield 43 having an inner mild steel thermal shield 44. The shield 43 locates the support structure 4 and has a detachable concrete end plug 45.

The two series of pads 5 extend over the length of the pressure vessel 3, as indicated by dimension 71 in FIG. 1, the pads 5 being welded to the pressure vessel 3 and being carried on bearing plates 46 welded to support frames 47 which form part of the support structure 4. The two series of pads 6 extend over the length of the core 2 and the shield 29, as indicated by dimension 72 in FIG. 1, so as to support the shield 29 as well as the core 2. The pads 6 are welded to the pressure vessel 3 and the core 2 is carried on the pads 6 by bearing plates 48 welded to the core skirt 14. Similarly, the shield 29 is carried on the pads 6 by a bearing plate welded to the casing 31.

The keys 7, 9 and the keyways 8, 12 are positioned at each end of the core 2 and at each end of the shield 29. The keys 7 are welded to the core skirt 14 or to the casing 31, and the keyways 8 are formed by plates 49 welded to girders 50, the plates 49 and the girders 50 being welded to the pressure vessel 3. The girders 10 of the keys 9 are in line with the girders 50 and are welded to the pressure vessel 3. The tapered end pads 11 of the keys 9 are welded to the girders 10. The tapered pads 13 of the keyways 12 are welded to support frames 51 forming part of the support structure 4.

The shield 29 is located at one end by bolted brackets 52, and the pressure vessel 3 is secured by spring-loaded straps 53 bolted to the support frames 47.

Support for the reactor 1 comprises a welded box-grid structure 54 having a bottom plate 55, longitudinally extending girders 56 and transverse plates 57. The biological shield 43 is supported on the structure 54 by replaceable rubber pads 58 carried by plates 59 supported by transverse girders 60. The biological shield 43 is located relative to the structure 54 by having transverse keying parts 61 located by angle-girders 62, and longitudinally extending keying parts 63 located by angle-girders 64.

For charging and discharging of the reactor 1 with fuel elements, charge tubes indicated by centre-lines 73 in FIG. 1 are provided. Control rod channels and detachable control rod tubes are indicated by centre-lines 74 in FIG. 1.

In operation, coolant flow through the reactor 1 is as follows. Coolant gas enters the gas duct 38 as shown by arrows 65, to flow into the pressure vessel 3, as shown by arrows 66. The gas then flows along the space between the core skirt 14 and the pressure vessel 3 as shown by arrows 67 to flow through the fuel element channels 23 as shown by arrows 68. The hot gas then flows out into the gas space 28 and through the ducts 35 to the gas space 33, as shown by arrows 69, and then out through the gas duct 36 as shown by arrows 70.

The pads 5, 6 are thus situated in cooled regions of the reactor 1, as also are the keys 7, 9 and the keyways 8, 12. The keys 9 and the keyways 12 are designed so that the tapered pads 11, 13 remain in contact whilst the pressure vessel 3 expands and contracts with temperature variations within the core 2, thus providing constant location for the pressure vessel 3. The keys 7 and the keyways 8 provide location for the core 2 whilst it expands and contracts with temperature variations.

The bearing plates 46, 48 are shaped so as to minimize any tendency there may be for the pressure vessel 3 and the core 2 to rotate.

The reactor 1 is suitable for mounting in a moving structure, such as a ship, as well as in a land based installation. In the former case, consideration has to be given to the possibility of the ship capsizing, and the provision of the straps 53 gives support for the pressure vessel 3 and the core 2 in such an event.

The reactor 1 is also designed so that the core 2 is replaceable in emergency. Thus by disconnecting the ducts 36, 38 and withdrawing the duct 36, detaching the control rod charge tubes and removing the plug 45, the end cap 40 and the brackets 52, the core 2 and the shield 29 may be removed as a single unit, the shield 29 providing the necessary protection during the removal operation.

We claim:

1. A nuclear reactor comprising a pressure vessel support structure, a horizontally orientated cylindrical pressure vessel within said structure, a reactor core within said pressure vessel, first support means between the lower region of said pressure vessel and the pressure vessel support structure, said first support means acting radially relative to said pressure vessel, second support means between the pressure vessel and the lower region of said core structure and in line with said first support means for the pressure vessel, first longitudinal keying means between the pressure vessel and the pressure vessel support structure in the upper regions of the pressure vessel, and second longitudinal keying means between the pressure vessel and the reactor core in the upper region of the pressure vessel.

2. A nuclear reactor as claimed in claim 1 wherein said first longitudinal keying means has faces tapered outwardly in a direction from the pressure vessel so as to allow radial movement of the pressure vessel relative to the pressure vessel support structure.

3. A nuclear reactor as claimed in claim 1 wherein said pressure vessel support structure is enclosed within and supported by biological shielding, said shielding being supported by a shielding support structure, and keying means are provided between the lower region of said shielding and said shielding support structure, said keying means acting transverse relative to said pressure vessel.

References Cited in the file of this patent

UNITED STATES PATENTS 2,780,596    Anderson _____ Feb. 5, 1957

OTHER REFERENCES

Atomic Energy Commission Document ANL–5327 (Del.), Design Study of Small Boiling Reactors for Power and Heat Production, Treshow, November 1954, declassified March 6, 1957, pages 25, 30, 65.

Energia Nucleare, vol. 4, No. 6, December 1957, page 459.